United States Patent
Oikawa

(10) Patent No.: US 9,307,113 B2
(45) Date of Patent: Apr. 5, 2016

(54) DISPLAY CONTROL APPARATUS AND CONTROL METHOD THEREOF

(71) Applicant: CANON KABUSHIKI KAISHA, Tokyo (JP)

(72) Inventor: Ryo Oikawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 185 days.

(21) Appl. No.: 14/254,728

(22) Filed: Apr. 16, 2014

(65) Prior Publication Data

US 2014/0317529 A1 Oct. 23, 2014

(30) Foreign Application Priority Data

Apr. 18, 2013 (JP) .................. 2013-087696

(51) Int. Cl.
G06F 3/00 (2006.01)
H04N 1/32 (2006.01)
H04N 101/00 (2006.01)

(52) U.S. Cl.
CPC ........ H04N 1/32101 (2013.01); *H04N 1/32128* (2013.01); *H04N 2101/00* (2013.01); *H04N 2201/0084* (2013.01); *H04N 2201/3205* (2013.01); *H04N 2201/3245* (2013.01); *H04N 2201/3253* (2013.01); *H04N 2201/3266* (2013.01); *H04N 2201/3273* (2013.01); *H04N 2201/3278* (2013.01)

(58) Field of Classification Search
CPC ............................................ H04N 2201/3273
USPC ........................................................ 715/748
See application file for complete search history.

(56) References Cited

U.S. PATENT DOCUMENTS 6,532,039 B2 * 3/2003 Anderson .......... H04N 1/32144
348/231.3
7,155,679 B2 * 12/2006 Bandaru ........... G06F 17/30265
707/E17.029
2008/0279468 A1 * 11/2008 Shiohara ............. H04N 1/00278
382/254
2009/0003797 A1 * 1/2009 Nash ................. G06F 17/30265
386/250
2010/0103287 A1 * 4/2010 Oikawa .................. H04N 5/765
348/231.99
2010/0303368 A1 * 12/2010 Jang .................... H04N 1/32138
382/233
2011/0193985 A1 * 8/2011 Inoue ................. H04N 5/23216
348/222.1
2012/0069233 A1 * 3/2012 Nonaka .............. H04N 1/00244
348/333.02
2012/0127302 A1 * 5/2012 Imai .................... H04N 1/00323
348/135
2012/0249840 A1 * 10/2012 Hirata .................... H04N 5/262
348/239
2012/0287325 A1 * 11/2012 Oikawa .................. H04N 5/772
348/333.02

FOREIGN PATENT DOCUMENTS

JP 2009-116500 A 5/2009

* cited by examiner

*Primary Examiner* — William Titcomb
(74) *Attorney, Agent, or Firm* — Canon USA, Inc., IP Division

(57) ABSTRACT

A display control apparatus includes a recording unit configured to record in a recording medium an image file with which position information and date and time information are associated, a reproducing unit configured to reproduce the image file recorded in the recording medium, an acquiring unit configured to acquire multiple pieces of tag information determined based on position information associated with the image file to be reproduced by the reproducing unit, a determining unit configured to determine tag information to be displayed on a playback screen of the image file based on date and time information in the acquired multiple pieces of tag information, and a display control unit configured to perform control to display the tag information determined by the determining unit on the playback screen of the image file.

19 Claims, 14 Drawing Sheets

FIG. 4

| USER NAME |
|---|
| POSITION INFORMATION |
| REGISTRATION DATE AND TIME |
| DATA TYPE |
| DATA CONTENT |

DISPLAY CONTROL APPARATUS AND CONTROL METHOD THEREOF

BACKGROUND OF THE INVENTION

1. Field of the Invention

The present invention relates to display control apparatuses and a control method thereof.

2. Description of the Related Art

In recent years, a service is provided for an image pickup apparatus that functions as a display control apparatus, in which the image pickup apparatus is allowed to register, using GPS and a network connection unit, a tag generated by a user in a network server along with position information acquired from GPS. Other general public users may acquire a tag based on current position information acquired from GPS by an image pickup apparatus among the tags registered in the network server. The acquired tag is displayed on a display unit over a subject currently displayed by the image pickup apparatus. Tags including text, an audio file, and an image file may be registered. Such a tag is displayed on a display unit as an icon according to its type over a subject at a position corresponding to its position information. When an icon indicative of a tag is selected on a display unit, registered detailed information on the tag may be displayed.

Such a tag is generated by a general user that is allowed to access the network server. Thus, a significantly large number of tags may possibly be registered therein. Accordingly, tags may be filtered and acquired based on time and position. More specifically, filtering may be performed through which tags within designated dates and times are acquired based on dates and times the tags have been registered in the network server or tags registered only within a distance designated based on current position information of the image pickup apparatus are acquired.

Japanese Patent Laid-Open No. 2009-116500 discloses a method for acquiring corresponding data from a network server based on its image capturing location or date.

However, Japanese Patent Laid-Open No. 2009-116500 only allows a user to designate a date and time or a range of dates from the current date and time for applying time-based filtering to acquire a tag. For that reason, when an image captured in the past is previewed on the display, in order to check a tag with reference to the image capturing date and time, for example, a user may be required to acquire the capturing date and time of the image and input the acquired date and time or range. This may make the tag acquisition operation complicated and may possibly prevent execution of proper filtering when an input error occurs.

SUMMARY OF THE INVENTION

The present invention may easily allow proper filtering.

According to an aspect of the present invention, there is provided a display control apparatus including a recording unit configured to record in a recording medium an image file with which position information and date and time information are associated, a reproducing unit configured to reproduce an image file recorded in the recording medium, a receiving unit configured to receive tag information determined based on position information associated with the image file to be reproduced by the reproducing unit among tag information recorded in a recording medium of an external device, a determining unit configured to determine tag information to be displayed over a playback screen of the image file based on date and time information associated with the image file to be reproduced in the received tag information, and a display control unit configured to perform control to display the tag information determined by the determining unit over the playback screen of the image file.

Further features of the present invention will become apparent from the following description of exemplary embodiments with reference to the attached drawings.

BRIEF DESCRIPTION OF THE DRAWINGS

FIG. 4 illustrates a configuration of a tag.

DESCRIPTION OF THE EMBODIMENTS

A display control apparatus according to exemplary embodiments will be described in detail below with reference to drawings. However, various changes may be made to components described according to exemplary embodiments in accordance with the configuration of an apparatus or a condition to which the present invention is applied, and the present invention is not limited to the exemplary embodiments.

First Exemplary Embodiment

Figure 1:
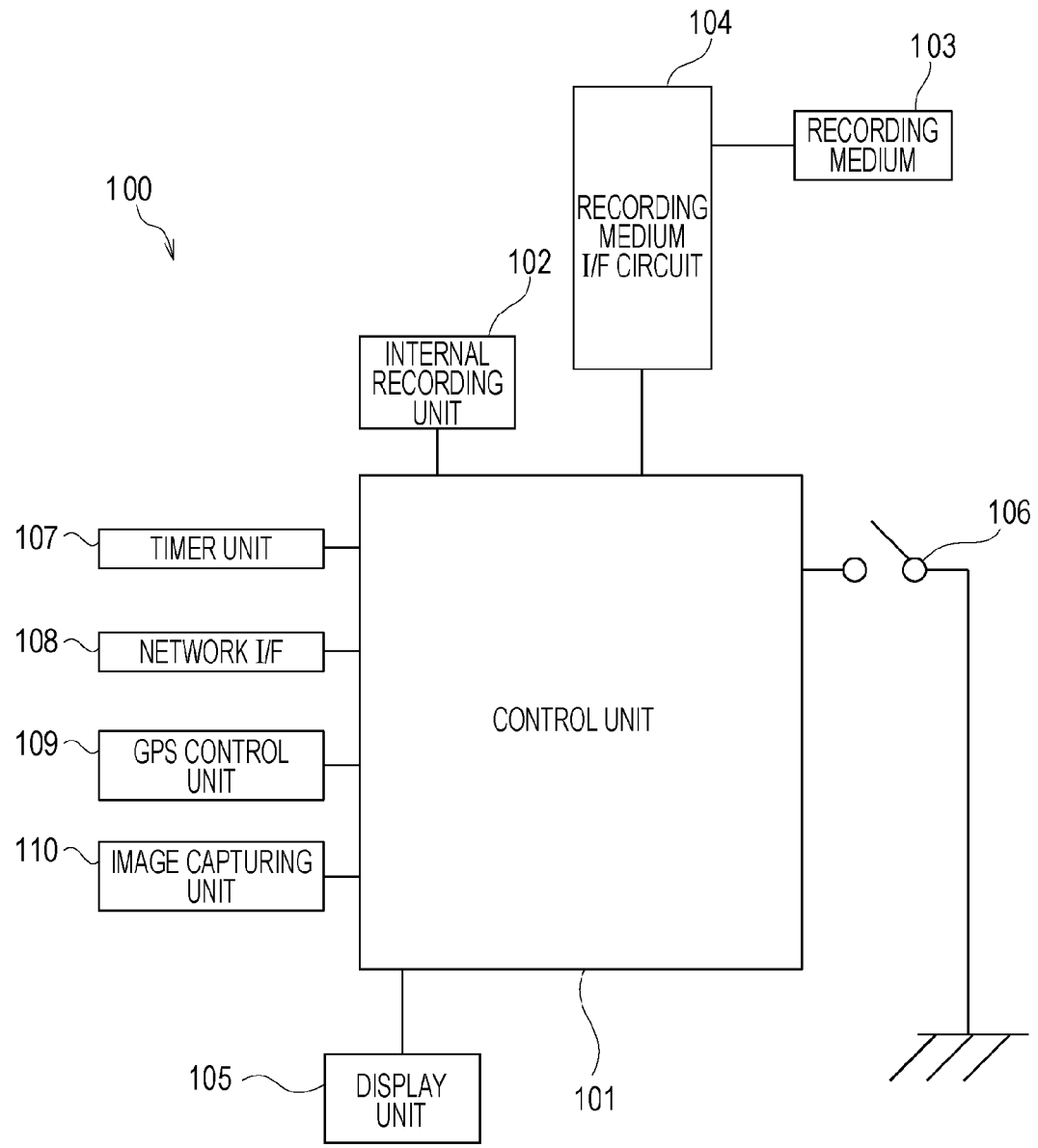
FIG. 1 is a block diagram illustrating a configuration of a display control apparatus.

FIG. 1 is a block diagram illustrating a configuration of a display control apparatus according to a first exemplary embodiment. An image pickup apparatus will be described as a display control apparatus according to this exemplary embodiment, but the display control apparatus is not limited thereto. The display control apparatus may be a cellular phone, a personal computer, a what-is-called tablet device or other information processing apparatus, for example.

A display control apparatus 100 includes a control unit 101, an internal recording unit 102, a recording medium 103, a recording medium I/F circuit 104, a display unit 105, an input unit 106, a timer unit 107, a network I/F 108, a GPS control unit 109, and an image capturing unit 110.

The control unit 101 controls overall operations of components in the display control apparatus 100. The control unit 101 may be a CPU. Instead of control over the apparatus by the control unit 101, a plurality of hardware elements share processes for overall control of the apparatus.

The internal recording unit 102 may decompress and temporarily record image data to be displayed or may temporarily record control data.

The recording medium 103 is an example of a recording unit and may record an image file such as a JPEG file and a MOV file captured by the image pickup apparatus. Data of an image file recorded in the recording medium 103 is read through the recording medium I/F circuit 104 and is decompressed in the internal recording unit 102. The recording medium 103 may be internally contained in a main body of the display control apparatus 100.

The display unit 105 is a display device that may be configured to display an image file read from the recording medium 103 and may be usable to define settings for the display control apparatus 100.

The input unit 106 is an operating member usable for inputting a setting in the display control apparatus 100. A user may define a setting for the display control apparatus 100 with an input unit 106 by checking input data on the display unit 105. The input unit 106 may include, for example, a power button usable by a user to instruct to power on/off the display control apparatus 100, a release switch usable for instructing to capture an image by using an image capturing unit, which will be described below, and a reproduction button usable for instructing reproduction of image data. The input unit 106 may further include a touch panel provided on the display unit 105. The release switch includes SW1 and SW2. The release switch may be half pressed to turn on the SW1. This instructs a preparation for capturing such as an autofocus (AF) process, an automatic exposure (AE) process, an auto white balance (AWB) process, a pre-flashing (EF) process. The release switch may be fully pressed to turn on the SW2. This instructs to capture an image.

The timer unit 107 may measure the current date and time in the display control apparatus 100. The timer unit 107 may be a radio wave clock, for example. The timer unit 107 is an example of a date-and-time acquiring unit.

The network I/F 108 is an interface for connecting to a network to allow communication between the display control apparatus 100 and a network server (server) that is an external device. According to this exemplary embodiment, the network I/F 108 is an antenna, and the control unit 101 may connect to an external device through the antenna. A protocol for data communication here may be PTP/IP (Picture Transfer Protocol over Internet Protocol) through a wireless LAN, for example. The communication with the display control apparatus 100 is not limited thereto. For example, the network I/F 108 may include an infrared ray communication module, a Bluetooth (registered trademark) communication module, and a radio communication module such as a Wireless USB. Further or alternatively, wired connection may be used such as a USB cable, an HDMI (registered trademark), and an IEEE1394.

The GPS control unit 109 acquires position information (GPS data) on the current position of the display control apparatus 100 through GPS. More specifically, the GPS control unit 109 performs a positioning process. The positioning process may include receiving a signal from a GPS satellite and calculating position information describing the position of the display control apparatus 100 from the received signal. According to this exemplary embodiment, the position information is represented by latitude/longitude coordinates. The position information is provided to the control unit 101 as required. According to this exemplary embodiment, GPS control unit 109 is used as a unit configured to acquire position information. However, a unit configured to acquire position information is not limited to GPS control unit 109. For example, it may be a device configured to acquire position information from an external device such as a cellular phone or a base station. The display control apparatus 100 may not always be required to internally contain the GPS control unit 109. For example, such a unit may be configured to acquire position information from another device having a GPS function. The GPS control unit 109 is an example of a position acquiring unit.

The image capturing unit 110 converts object light focused on a lens contained in the image capturing unit 110 to an electric signal, performs a noise reduction process and other processes and outputs digital data as image data. After the captured image data is stored in the internal recording unit 102, the control unit 101 performs a predetermined operation thereon. The resulting image data is recorded in the recording medium 103.

Outline of Tag Registration and Usage

First, with reference to FIG. 2, operations will be described which include registering a tag in a network server, acquiring the registered tag, and displaying it over an image. Hereinafter, an image pickup apparatus (a what-is-called digital camera) is used as an example of the display control apparatus 100.

Figure 2:
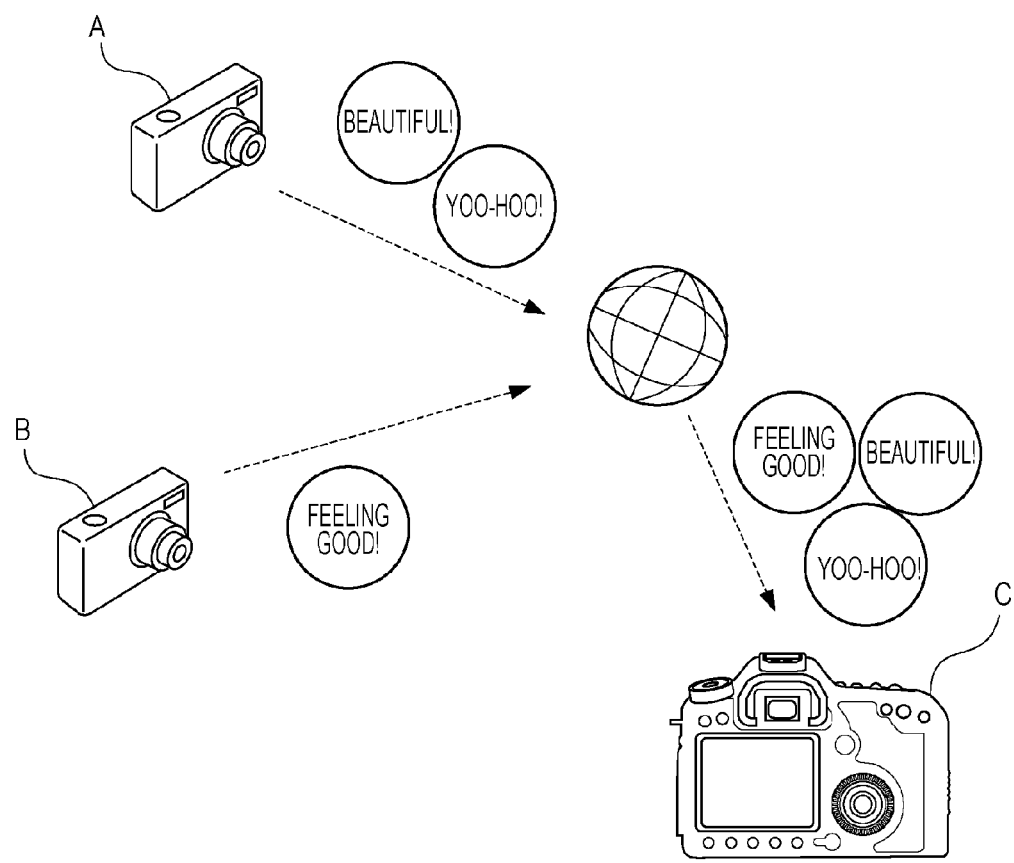
FIG. 2 is a schematic diagram for explaining registration and acquisition of a tag.

FIG. 2 is a schematic diagram for explaining tag registration and tag acquisition. Referring to FIG. 2, image pickup apparatuses A, B, and C are connected to a network server.

Here, the image pickup apparatuses A and B generate tags. The generated tags are transmitted to the network server along with position information describing the positions of the image pickup apparatuses A and B as of the time when the tags are generated and are registered in association with the position information. For example, in order to generate a tag "BEAUTIFUL!" in the image pickup apparatus A, a user may select an item under a menu displayed on the display unit 105 in the image pickup apparatus A to display a screen for generating the tag. A user may then use a software keyboard displayed on the display unit 105, for example, to input a character string "BEAUTIFUL!" through the input unit 106 to instruct to generate the tag "BEAUTIFUL!" to the control unit 101. As a result, the network server holds the tags generated by the image pickup apparatuses A and B along with position information describing the positions of the image pickup apparatuses as of the time when the tags are generated.

On the other hand, the image pickup apparatus C acquires from the network server a tag corresponding to the current position information acquired by the GPS control unit 109 through GPS. More specifically, the image pickup apparatus C may transmit a signal for requesting a tag along with the current position information to the network server. In response thereto, the network server transmits the corresponding tag to the image pickup apparatus C. The image pickup apparatus C having received the tag that is the response acquires the tag corresponding to the current position information. Here, the tag corresponding to the current position information is a tag associated with position information within a predetermined distance from the current position. For example, a tag associated with position information within 100 m around the current position acquired from GPS is transmitted from the network server to the image pickup apparatus C. For example, in a case where the tag "BEAUTIFUL!" is registered by the image pickup apparatus A in the network server along with position information describing a position within a predetermined distance from the current position of the image pickup apparatus C, the network server transmits the tag "BEAUTIFUL!" to the image pickup apparatus C. The image pickup apparatuses A to C are not functionally different. This example merely shows a case that the image pickup apparatuses A and B generate tags. In other words, the image pickup apparatus C is also capable of generating and registering a tag in a network server, and the image pickup apparatuses A and B are also capable of acquiring a tag registered by another apparatus in the network server, like the image pickup apparatus C.

Displaying Tag Over Live View Image

Next, displaying a tag as described above over a live view image captured by an image pickup apparatus and displayed on the display unit 105 will be described with reference to the example in FIG. 3.

Figure 3:
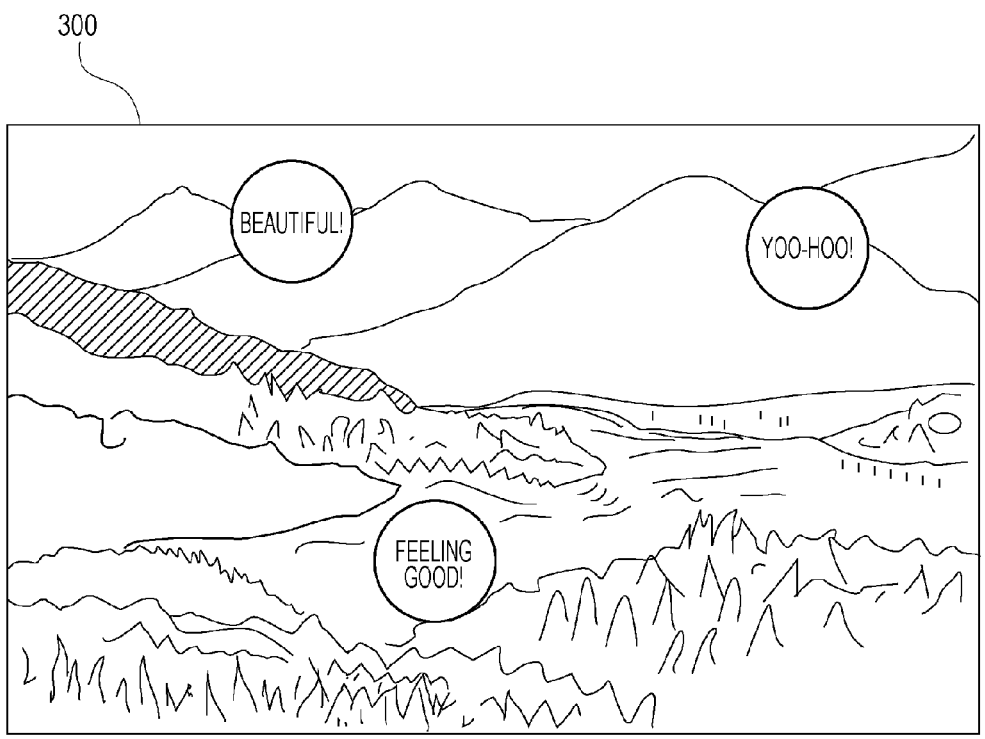
FIG. 3 illustrates an example of a live view screen.

FIG. 3 illustrates an example of a live view screen that is being currently captured by the image pickup apparatus C. The display control apparatus 100 of this exemplary embodiment may use the image capturing unit 110 to serially capturing images and sequentially output the corresponding live view image to the display unit 105 so that the preview of the captured images may be updated in real time (that is, the live view is displayed). A user is allowed to change the timing for image capturing or a parameter for image capturing by watching the live view.

As shown on a live view screen 300, the image pickup apparatus C displays a tag acquired from the network server over the live view image that is currently being captured (overlap display). In FIG. 3, the acquired tag is displayed as an icon.

A configuration of a tag will be described below. FIG. 4 illustrates a configuration of a tag.

A tag includes a user name of a user who has generated the tag, position information describing a position where the tag has been generated, a registered date and time when the tag has been generated, a data type describing data in the tag, and data content. The registration date and time is a date and time when a tag is registered in a network server. The data type may be selectable from text, audio, and image.

Figure 5:
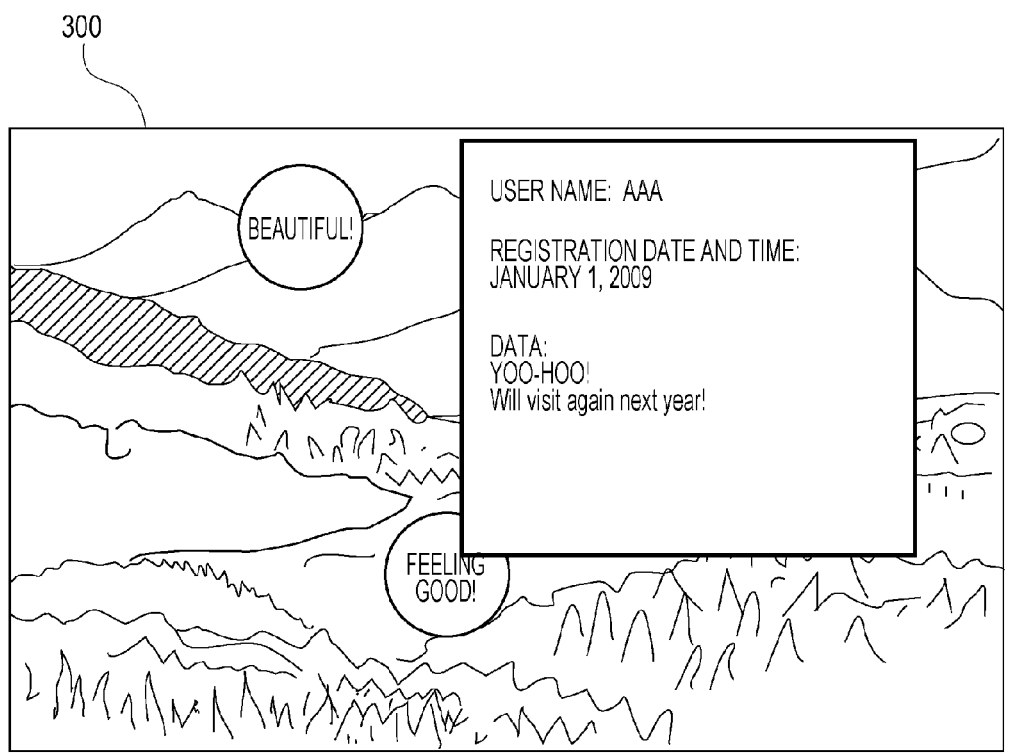
FIG. 5 illustrates an example of displayed detailed information of a tag.

FIG. 5 illustrates an example of displayed detailed information of such a tag.

When a user selects an icon for a tag displayed over a live view screen, the image pickup apparatus C displays detail information describing the tag. FIG. 5 illustrates a state where details of text data are displayed, and full text of registered text data is displayed. If it is audio data, a sound is output. If it is image data, an image is displayed.

There has been described above an outline of a scene where a tag is displayed over a live view image. According to this exemplary embodiment, the live view screens 300 displays a tag having its registration date and time within a predetermined period from the current date and time.

Tag Displayed Over Playback Image (Still Image)

Next, a scene will be described where a tag is displayed over a playback image of an image recorded in a recording medium.

First, before describing reproduction of an image, a process will be described for setting how a tag is to be displayed with respect to a reproduced image.

The display control apparatus 100 of this exemplary embodiment is capable of receiving input of a setting for distinction between a tag to be displayed and a tag not to be displayed through the input unit 106. The distinction between a tag to be displayed and a tag not to be displayed will be called filtering in the following description.

Figure 7:
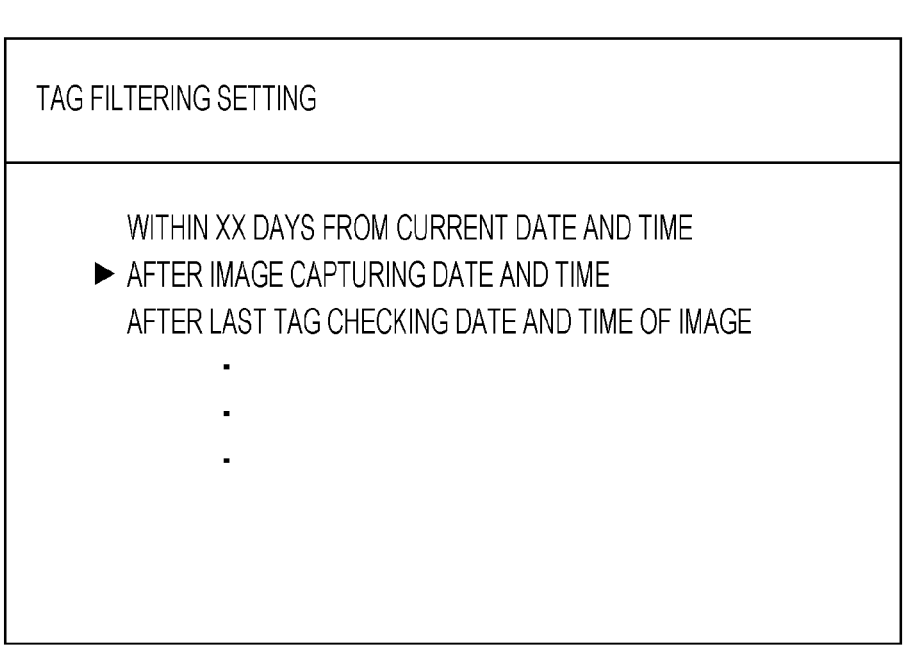
FIG. 7 illustrates examples of setting items for filtering.

FIG. 7 illustrates an example of setting items for filtering. The control unit 101 displays a screen showing setting items for filtering illustrated in FIG. 7 on the display unit 105. A user may select an item through the input unit 106 to input its corresponding setting for filtering.

When "WITHIN XX DAYS FROM THE CURRENT DATE AND TIME" is selected out of the items shown in FIG. 7, filtering is performed with reference to the current date and time. In other words, a tag having its registration date and time within a predetermined period (XX days here) from the current date and time is identified as a tag to be displayed and is distinguished from other tags. A user may input a certain date-and-time range as the predetermined period.

When "AFTER IMAGE CAPTURING DATE AND TIME" is selected, filtering is performed with reference to the generation date and time of an image file. In other words, a tag having its registration date and time after the generation date and time of the image file is identified as a tag to be displayed and is distinguished from other tags.

When "AFTER LAST TAG CHECKING DATE AND TIME OF IMAGE" is selected, filtering is performed with reference to the last tag checking date and time. According to this exemplary embodiment, an update date and time of an image file is used as the last tag checking date and time. An update date and time of an image file here refers to date and time information to be overwritten when data of the image file is executed after the image file is generated. According to this exemplary embodiment, when a tag is checked for reproduction of an image, the update date and time of the image is overwritten with the current date and time. Thus, because the date and time when the image is reproduced and the tag is displayed is held as an update date and time, the last date and time when a user has checked the tag for the image file may be acquired with reference to the update date and time.

When one of the items in FIG. 7 is selected, the control unit 101 records the filtering setting selected by a user in the internal recording unit 102. The setting held here is used for displaying the tag during reproduction of the image, which will be described below.

Next, with reference to the flowchart in FIG. 6, display of a tag during reproduction of an image file according to this exemplary embodiment will be described. The processes illustrated on the flowchart may be implemented by the control unit 101 in the display control apparatus 100 by executing programs recorded in a nonvolatile memory, not illustrated, and controlling the corresponding units in the display control apparatus 100 in accordance with the programs. The same is true in the following processes on the flowcharts to be executed by the display control apparatus 100. Each of the processes illustrated on the flowchart is started in response to receipt by the control unit 101 of a request for displaying an image file recorded in the recording medium 103 from a user through the input unit 106.

In step S601, the control unit 101 reads out a still image file (JPEG file) recorded in the recording medium 103 in response to an input and displays image data of the read still image file on the display unit 105. A still image file recorded in the recording medium 103 may be either generated by capturing with the image capturing unit 110 of the apparatus or may be generated by a different apparatus.

Next in step S602, the control unit 101 acquires reference date and time information to be referred in filtering. In this case, the date and time according to the filtering setting defined by a user through the UI in FIG. 7 before execution of this process on the flowchart are acquired as the reference date and time. This process will be described with reference to the flowchart in FIG. 9.

Figure 6:
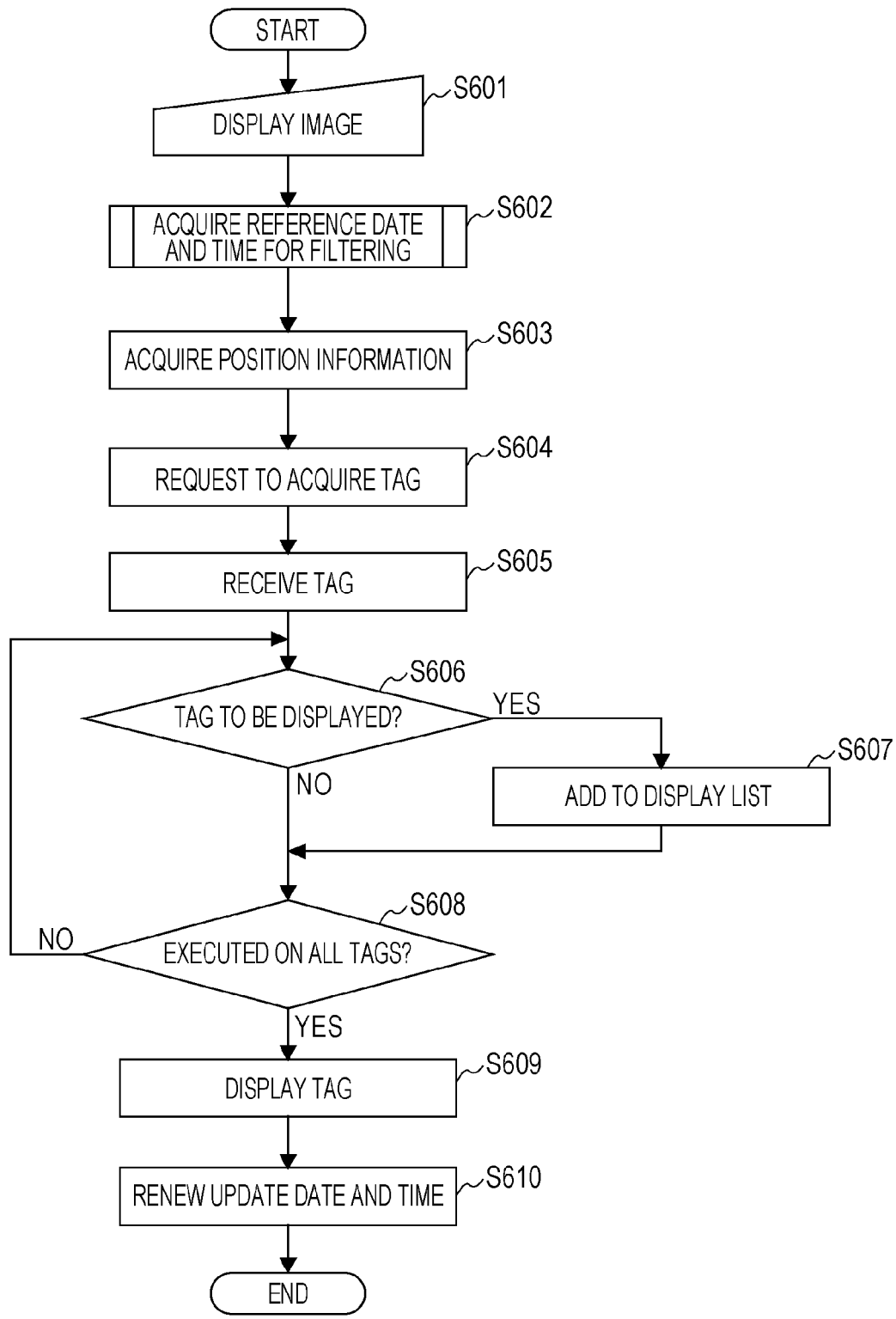
FIG. 6 is a flowchart illustrating a process of filtering of a first exemplary embodiment.
Figure 9:
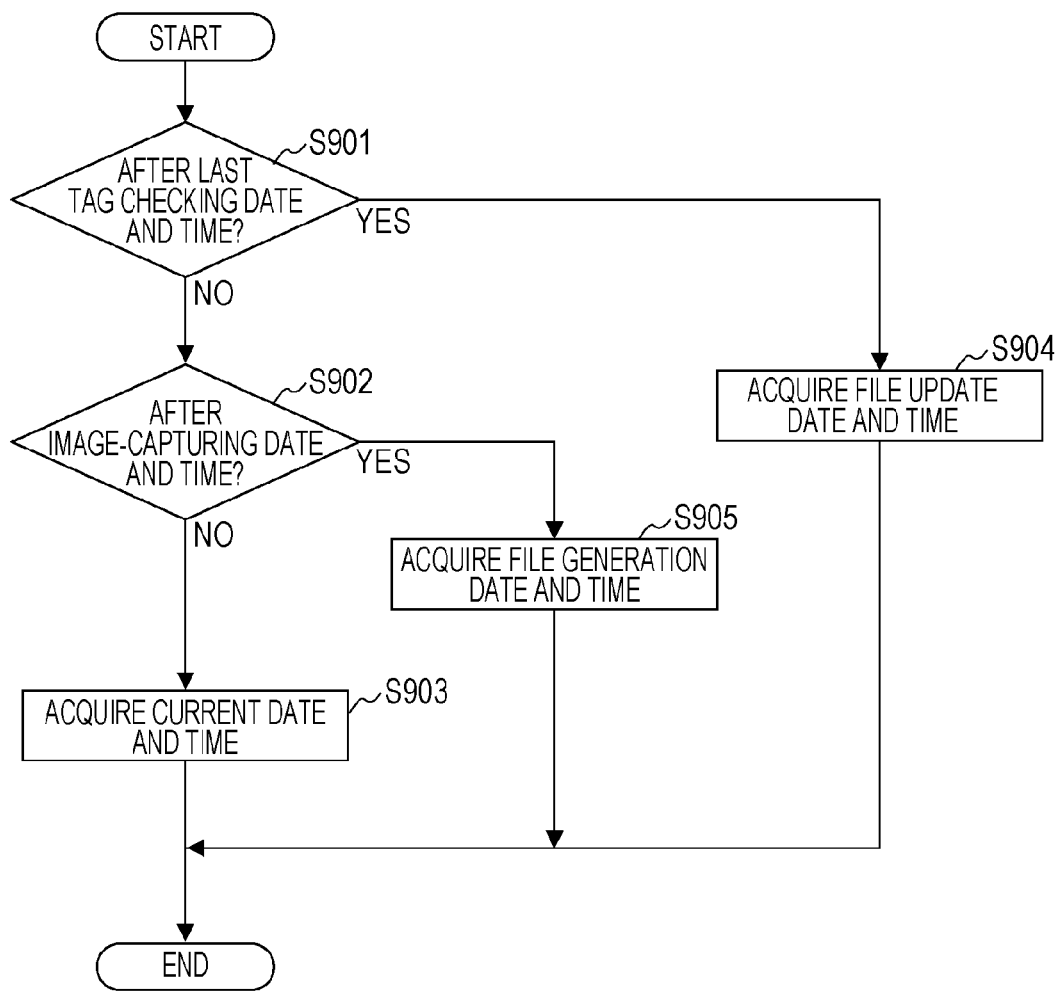
FIG. 9 is a flowchart illustrating a process of acquiring reference date and time information for filtering.

FIG. 9 is a flowchart illustrating the process in step S602 in FIG. 6.

In step S901, the control unit 101 determines whether the filtering setting is "AFTER LAST TAG CHECKING DATE AND TIME OF IMAGE" or not with reference to the filtering setting recorded in the internal recording unit 102.

First, a case will be described where the control unit 101 determines that the filtering setting is "AFTER LAST TAG CHECKING DATE AND TIME OF IMAGE". In this case, the process moves to step S904.

Figure 8:
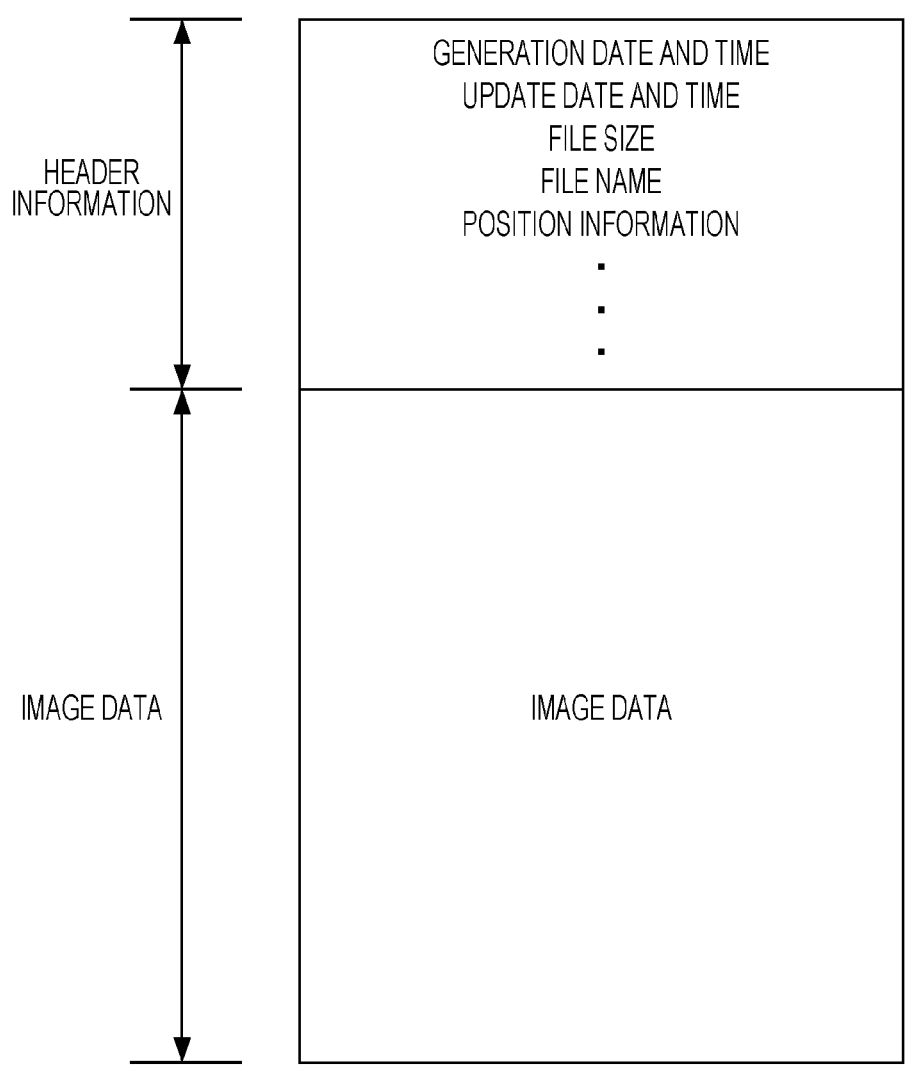
FIG. 8 illustrates a configuration of an image file.

In step S904, the control unit 101 acquires the update date and time of the still image file as the reference date and time information with reference to a header information part as illustrated in FIG. 8 of the still image file displayed on the display unit 105. While a case where the update date and time of an image file is acquired from the header information part of the image file will be described according to this exemplary embodiment, from where the update date and time of an image file is to be acquired is not limited to the method above. For example, an update date and time may be held for each image file in a management area (what is called directory entry) in a recording medium. In step S904, the update date and time of a target image file may be acquired with reference to the directory entry.

The update date and time of a still image file is acquired here because the update date and time of a still image file is updated to the date and time when a tag is checked last during reproduction of an image of the still image file as described above. The process of updating the update date and time will be described below with reference to FIG. 6.

The control unit 101 acquires the date-and-time range corresponding to the word "AFTER" as date-and-time range information. The term "date-and-time range" corresponding to the word "AFTER" refers to a period from a reference date and time to the current date and time when an image is reproduced.

On the other hand, in step S901, if the control unit 101 determines that the filtering setting is not "AFTER LAST TAG CHECKING DATE AND TIME OF IMAGE", the process moves to step S902.

In step S902, the control unit 101 determines whether the filtering setting is "AFTER IMAGE CAPTURING DATE AND TIME" or not with reference to the filtering setting recorded in the internal recording unit 102.

First, a case will be described where the control unit 101 determines that the filtering setting is "AFTER IMAGE CAPTURING DATE AND TIME". In this case, the process moves to step S905.

In step S905, the control unit 101 acquires the generation date and time of a still image file as a reference date and time information with reference to the header information part as illustrated in FIG. 8 of a still image file displayed on the display unit 105.

The control unit 101 acquires the date-and-time range corresponding to the word "AFTER" as the date-and-time range information.

On the other hand, if the control unit 101 determines in step S902 that the filtering setting is not "AFTER IMAGE CAPTURING DATE AND TIME", the process moves to step S903.

In step S903, the control unit 101 determines that the filtering setting is "WITHIN XX DAYS FROM THE CURRENT DATE AND TIME", and the control unit 101 acquires the current date and time as reference date and time information from the timer unit 107.

The control unit 101 further acquires the date-and-time range corresponding to the word "XX days" input in advance for the filtering settings as the date-and-time range information. The term "date-and-time range" corresponding to the word "XX days" refers to a period XX days before the current date and time.

In this manner, the control unit 101 acquires the reference date and time information and date-and-time range information with reference to the predefined filtering setting.

Referring back to FIG. 6, in step S603, the control unit 101 acquires position information (GPS data) described in a still image file that is being reproduced currently and analyzes it through the GPS control unit 109.

A configuration of a still image file will be described. FIG. 8 is a schematic diagram illustrating a configuration of a still image file.

A still image file includes a header information part and an image data part. The header information part includes a generation date and time, an update date and time, a file size, a file name, and position information. The position information is GPS data acquired by the GPS control unit 109 through GPS when the image pickup apparatus captures the still image. This allows the control unit 101 to acquire position information from the header information part of the still image file.

Referring back to FIG. 6, next in step S604, the control unit 101 transmits the acquired position information to a network server through the network I/F 108 to execute a request for acquiring a tag (hereinafter, called a tag acquisition request). The network server having received the request determines the tag corresponding to the received position information from registered tags according to the tag acquisition request. The determined tag is transmitted to the display control apparatus 100. In this case, the tag corresponding to the position information is a tag associated with position within a predetermined distance from the position.

In step S605, the control unit 101 receives the tag transmitted from the network server through the network I/F 108.

In step S606, the control unit 101 determines whether the received tag is to be displayed or not. More specifically, the control unit 101 determines whether the date and time representing the registration date and time of the received tag is included within a time range that is determined based on the reference date and time information for filtering and the date-and-time range information. If it is determined that the date and time representing the registration date and time of the tag is included within the time range, the tag is determined to be displayed. The reference date and time information for filtering and date-and-time range information here is acquired in step S602.

If the control unit 101 determines that the received tag is to be displayed, the process moves to step S607. On the other hand, if the control unit 101 determines that the received tag is not to be displayed, the process moves to step S608.

In step S607, the control unit 101 adds the received tag to a display list as a tag to be displayed over an image and records it in the internal recording unit 102.

In step S608, the control unit 101 determines whether the determination in step S606 has been executed on all tags or not. If the control unit 101 determines that an undetermined tag is left, the process returns to step S606 where other tags are determined. On the other hand, if the control unit 101 determines that the determination has been executed on all tags, the process moves to step S609.

When the determination in step S606 has completely executed on all of the received tags, the control unit 101 in step S609 displays the tags listed in the display list over the image of the still image file being displayed on the display unit 105.

Finally, in step S610, the control unit 101 updates the update date and time of the image file on which the tags are superimposed with the current date and time. This may realize proper filtering in a case where "AFTER LAST TAG CHECKING DATE AND TIME OF IMAGE" is selected as a filtering setting.

Through these processes, tags to be displayed over a playback image may be narrowed correctly and easily. Tag Displayed over Playback Image (Moving Image)

Figure 10:
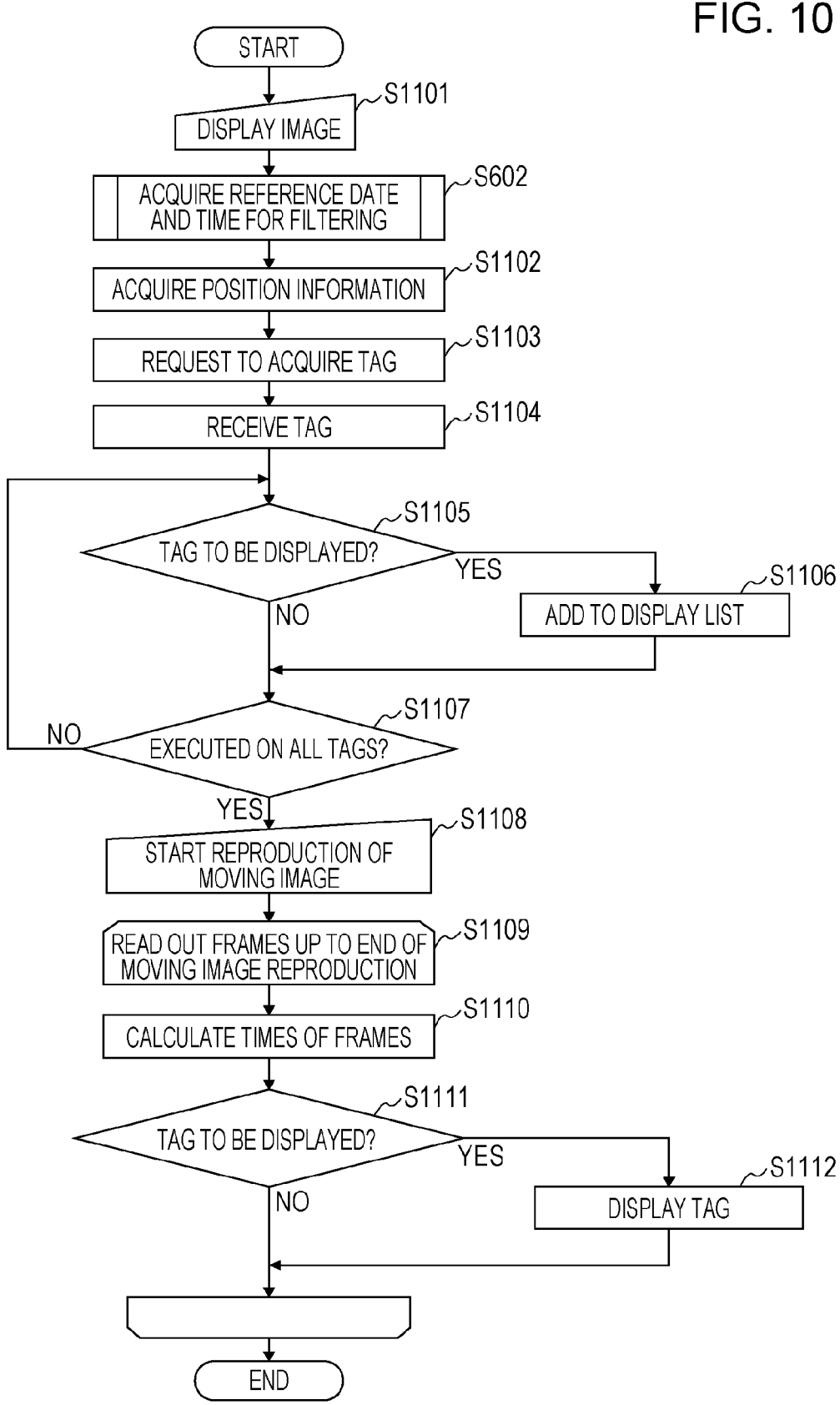
FIG. 10 is a flowchart illustrating a process of displaying a tag on a frame of a moving image file.

Next, with reference to the flowchart in FIG. 10, display of a tag over frames when a moving image file is reproduced will be described.

In step S1101, when a user selects through the input unit 106 a moving image file (MOV file) to be displayed on the display unit 105, the control unit 101 displays a thumbnail image of the moving image file on the display unit 105. The moving image file may be either generated by capturing with the image capturing unit 110 of the apparatus or may be generated by a different apparatus.

The processes in step S602 to step S1107 are the same as the processes in step S602 to step S608 on the flowchart in FIG. 6. Therefore, before step S1108, the control unit 101 adds a filtered tag to a display list and records in the internal recording unit 102.

In step S1108, in response to a user's instruction through the input unit 106 to reproduce the moving image file displayed on the display unit 105, the control unit 101 starts reproduction of the moving image file.

In step S1109, the control unit 101 reads the first frame to the last frame of the moving image file.

In step S1110, the control unit 101 newly acquires the reference date and time information for filtering corresponding to the read frames. More specifically, the control unit 101 adds a reproduction time from the first frame to the reference date and time acquired in step S602. This process corresponds to an example of a process by a calculating unit. The control unit 101 acquires the added date and time as the reference date and time information for filtering of the read frame. For example, when the generation date and time of the moving image file is acquired in step S602, the control unit 101 may add the reproduction time of the read frame to the acquired generation date and time to acquire new reference date and time information. It should be noted that the reproduction time from the first frame may be calculated from the frame rate of the moving image and the number of frames before the read frame. Thus, through the process in step S1110, new reference date and time information with respect to a certain frame may be acquired.

In step S1111, the control unit 101 determines whether the tags included in the display list generated in step S1106 corresponds to the reference date and time information or not. More specifically, the control unit 101 determines whether tags listed on the display list are to be displayed or not based on the tag registration date and time, the reference date and time information for filtering, and the date-and-time range information. In this case, the reference date and time information for filtering is acquired in step S1110, and the date-and-time range information is acquired in step S602. If a tag is determined to be displayed among the listed tags, the process moves to step S1112.

In step S1112, the control unit 101 displays a tag over an image of a frame that is being displayed on the display unit 105.

On the other hand, when no tag is determined to be displayed in step S1111, the process returns to step S1109, and the process in step S1110 is executed for the next frame.

In this manner, a tag according to the filtering setting may be displayed for each frame when a moving image file is reproduced.

Next, with reference to FIGS. 11 and 12, a process of renewing the update date and time of each frame of a moving image file will be described. In this case, the image pickup apparatus has a tag acquisition log function which may maintain logs of tag checking for each frame. It is assumed that a user sets ON the tag acquisition logging function through the input unit 106.

Figure 11:
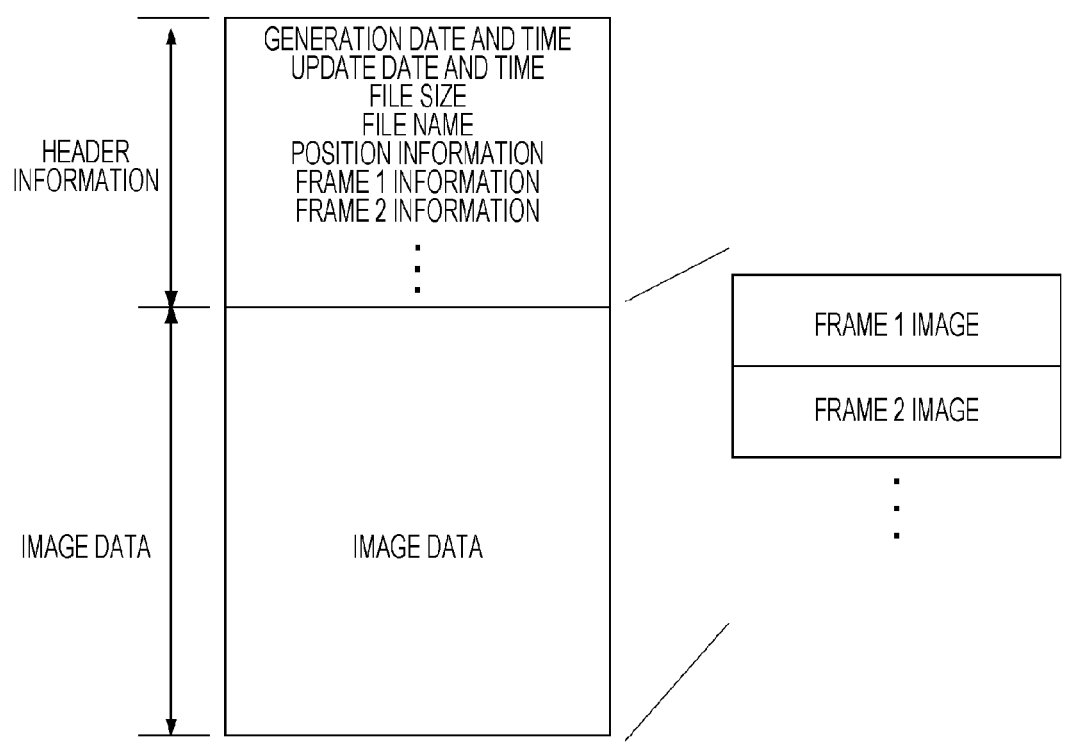
FIG. 11 illustrates a configuration of a moving image file.
Figure 12:
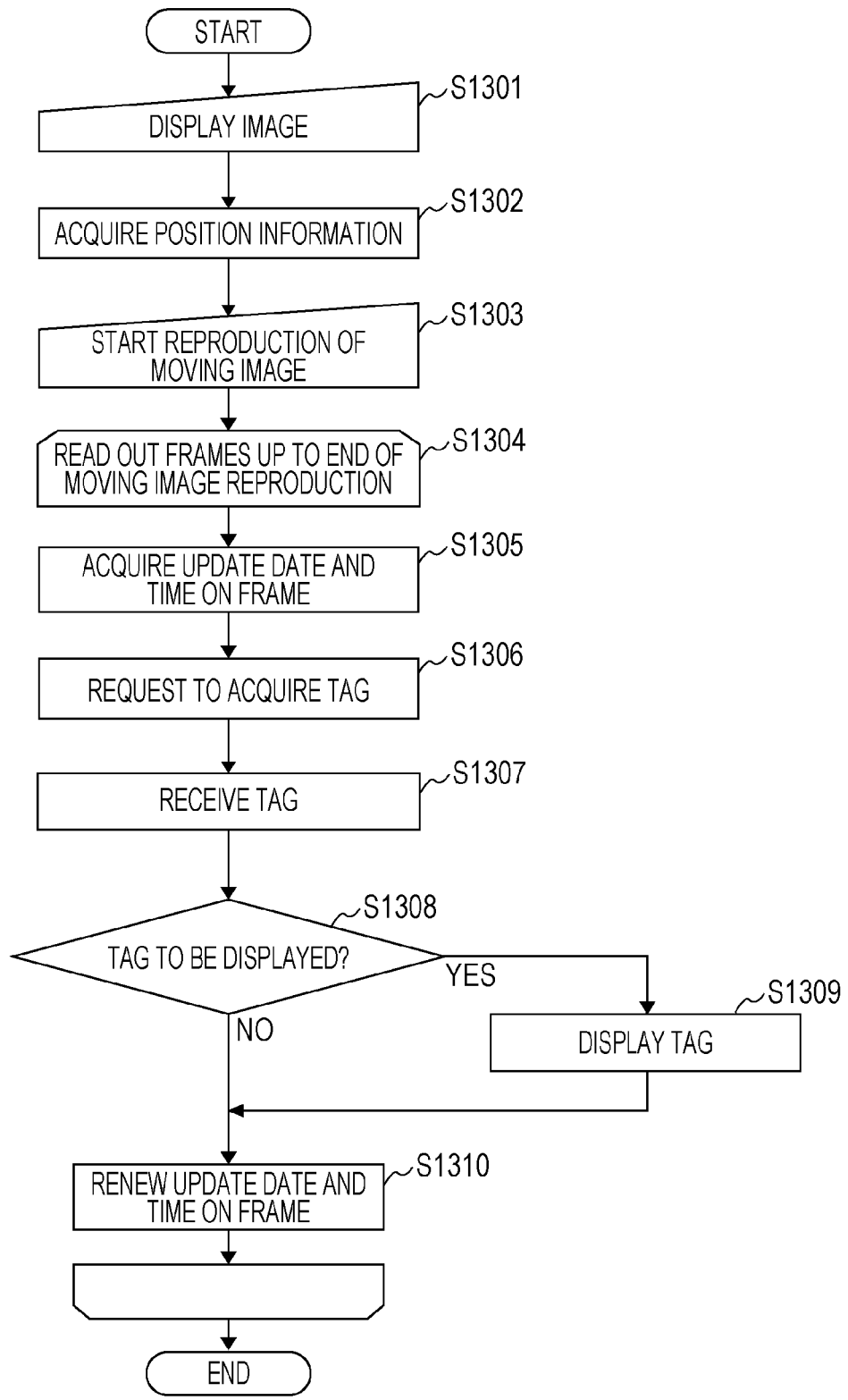
FIG. 12 is a flowchart illustrating a process of updating an update date and time of frame information on a moving image file.

FIG. 11 illustrates a configuration of a moving image file. The moving image file includes a header information part and an image data part. The image data part includes a frame image part and a list for each frame. The frame information for each frame is described in the header information part.

According to this exemplary embodiment, the date and time when a user checks the tag last is described as an update date and time in the header information part for allowing tag filtering on each frame.

With reference to the flowchart in FIG. 12, a process of renewing the update date and time for each frame of a moving image file will be described.

In step S1301, a user inputs an image display request through the input unit 106. The control unit 101 reads a moving image file (MOV file) recorded in the recording medium 103 in accordance with the input request and displays on the display unit 105 moving image data of the read moving image file.

In step S1302, the control unit 101 acquires the position information (GPS data) described in the moving image file to be reproduced and analyzes it through the GPS control unit 109.

In step S1303, in response to a user's instruction through the input unit 106 to reproduce the moving image file displayed on the display unit 105, the control unit 101 starts reproduction of the moving image file.

In step S1304, the control unit 101 reads the first frame to the last frame of the moving image file.

In step S1305, the control unit 101 acquires the update date and time of the read frame from frame information described in the header information part of the moving image file.

In step S1306, the control unit 101 transmits the position information acquired in step S1302 to a network server through the network I/F 108 to execute a request for acquiring a tag (hereinafter, called a tag acquisition request).

In step S1307, the network server transmits all tags corresponding to the received position information according to the tag acquisition request. The control unit 101 receives the tag transmitted from the network server through the network I/F 108.

In step S1308, the control unit 101 determines whether the received tag corresponds to the reference date and time information or not. More specifically, the control unit 101 determines whether the received tag is to be displayed or not based on the registration date and time of the received tag, reference date and time information for filtering, and date-and-time range information. In this case, the reference date and time information for filtering is the update date and time on the frame acquired in S1305. If a tag among received tags is to be displayed, the process moves to step S1309. On the other hand, when no tag is to be displayed, the process moves to step S1310.

In step S1309, the control unit 101 displays the tag determined to be displayed over the frame that is being displayed on the display unit 105.

In step S1310, the control unit 101 acquires the current date and time through the timer unit 107 and describes the acquired current date and time in the frame information in the header information part of the moving image file corresponding to the frame that is being displayed to renew the update date and time on the frame.

In this manner, renewing the frame information described in the header information part with the date and time when a user checks the tag last as an update date and time allows only display of a tag registered after a user checked the tag over each frame.

Next, with reference to FIGS. 13A and 13B, a tag to be displayed on a playback screen after filtering will be described. The words, "FEELING GOOD!", "BEAUTIFUL!", and "YOO-HOO!" in FIGS. 13A and 13B represent tags, and arrows extending from the tags indicate the times when the tags have been registered in a network server, that is, the registration dates and times of the tags.

Figure 13A:
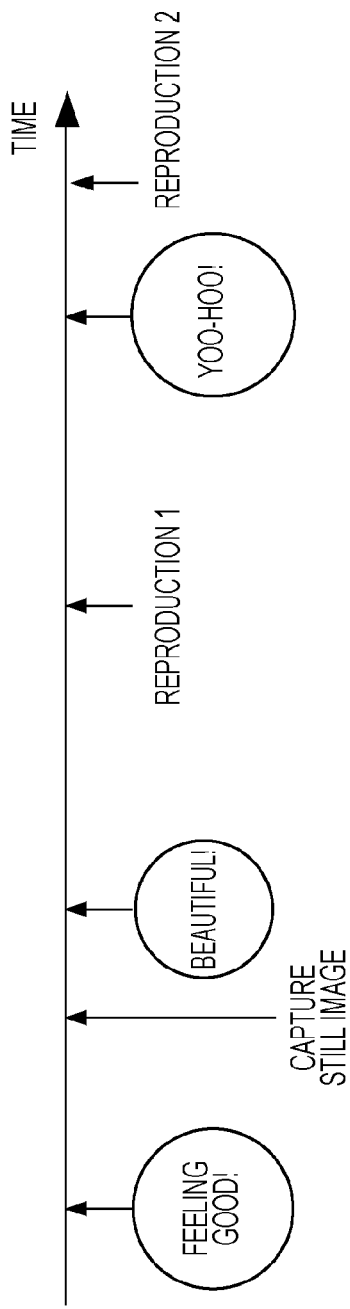
FIGS. 13A and 13B are diagrams for explaining tags to be displayed after filtering.
Figure 13B:
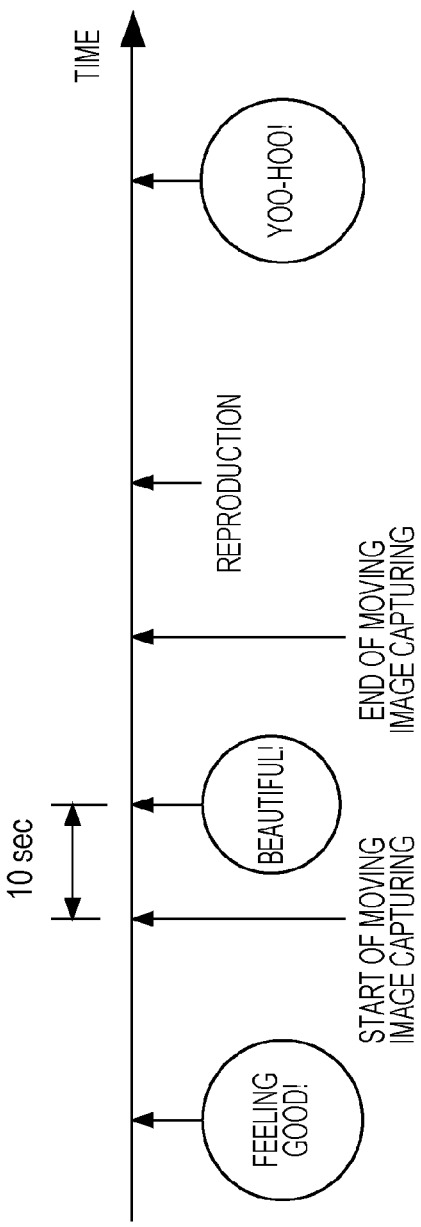

With reference to FIG. 13A, a tag to be displayed over a still image will be described.

First, display of a tag without the present invention will be described.

When an image is reproduced at a time indicated by "REPRODUCTION 1", the reference date and time information for filtering is the current date and time, that is, the time indicated by "REPRODUCTION 1". Thus, the tags "FEELING GOOD!" and "BEAUTIFUL!" are displayed over the image.

Next, display of a tag according to the present invention will be described.

When an image captured at a time indicated by "CAPTURE STILL IMAGE" and is reproduced at the time indicated by "REPRODUCTION 1" and if the filtering setting is "AFTER IMAGE CAPTURING DATE AND TIME", the tag "BEAUTIFUL!" is only displayed over the image.

When the image is reproduced again at the time indicated by "REPRODUCTION 2" and if the filtering setting is "AFTER LAST TAG CHECKING DATE AND TIME OF IMAGE", the update date and time of the image is renewed at the time indicated by "REPRODUCTION 1". Thus, the tag "YOO-HOO!" is only displayed over the image.

With reference to FIG. 13B, a tag to be displayed over frames of a moving image will be described.

First, display of a tag without the present invention will be described.

When an image is reproduced at a time indicated by "REPRODUCTION", the reference date and time information for filtering is the current date and time, that is, the time indicated by "REPRODUCTION". Thus, tags "FEELING GOOD!" and "BEAUTIFUL!" are displayed over the image.

Next, display of a tag according to the present invention will be described.

Referring to FIG. 13B, moving image capturing is executed during a period from the time indicated by "START OF MOVING IMAGE CAPTURING" to the time indicated by "END OF MOVING IMAGE CAPTURING".

It is assumed here that filtering is not performed in frames and that the filtering setting is "AFTER IMAGE CAPTURING DATE AND TIME". In this case, the reference date and time for filtering is the generation date and time of the moving image file, that is, the date and time indicated by "START OF MOVING IMAGE CAPTURING". Thus, the tag "BEAUTIFUL!" is displayed throughout during the reproduction of the moving image.

On the other hand, it is assumed that filtering is performed in frames and that the filtering setting is "AFTER IMAGE CAPTURING DATE AND TIME". The tag "BEAUTIFUL!" is registered 10 seconds after the start of the moving image capturing. Thus, the tag "BEAUTIFUL!" is displayed only for 10 seconds from the reproduction of the moving image and is not displayed after that.

According to this exemplary embodiment, the image pickup apparatus automatically acquires the reference date and time information to be used for tag filtering from an image file. This may eliminate the necessity for a user to check the generation date and time of the image file and may allow easily tag filtering. Because a user may not be required to directly input the generation date and time of an image file, input errors may be prevented for proper filtering.

Second Exemplary Embodiment

Figure 14:
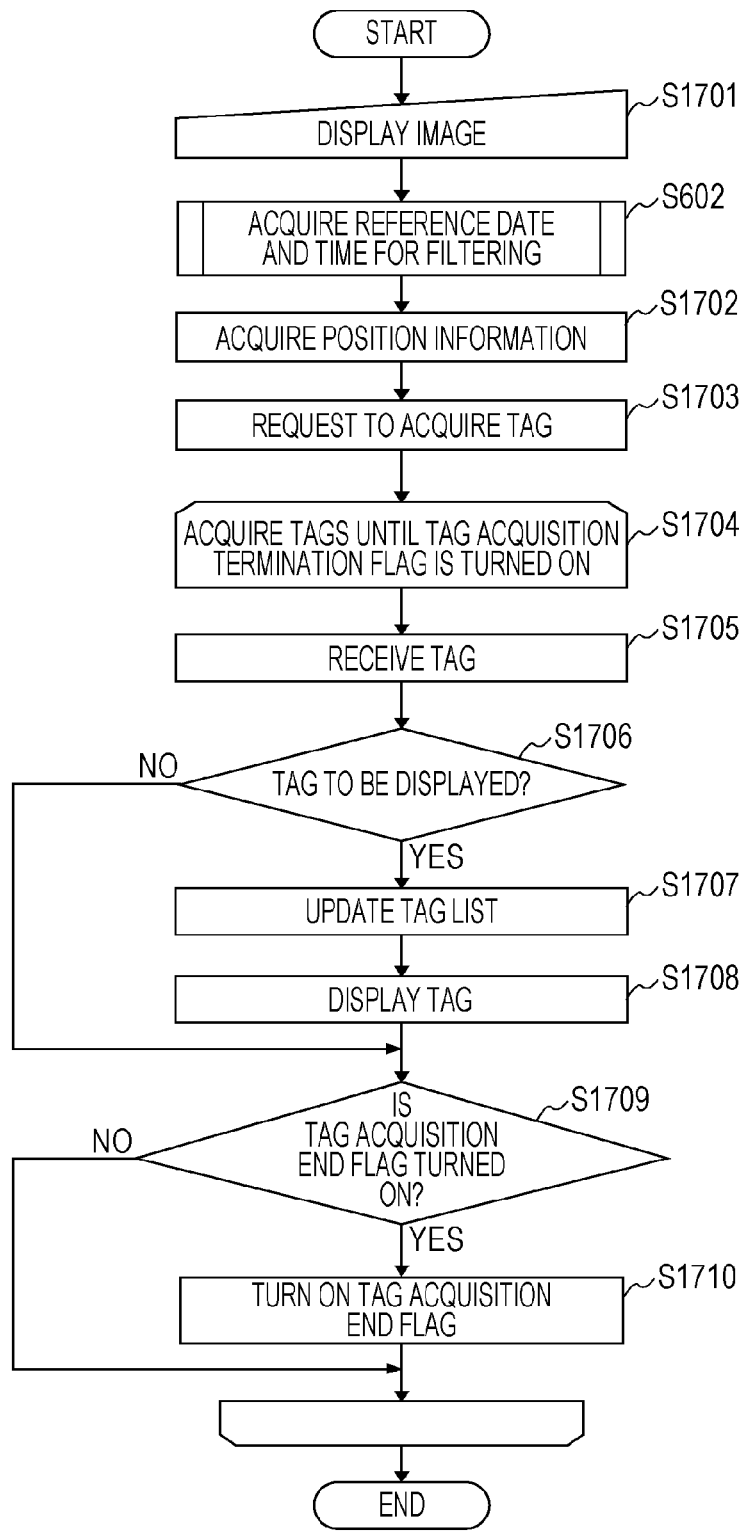
FIG. 14 is a flowchart illustrating a process of filtering according to a second exemplary embodiment.

Next, with reference to the flowchart in FIG. 14, there will be described a process of automatically updating and displaying a newly registered tag until the end of display of an image. In this case, the image pickup apparatus has an automatic tag update function of automatically updating a tag.

The processes from step S1701 to step S1703 are the same as the processes from step S601 to step S604 on the flowchart in FIG. 6.

In step S1704, the control unit 101 acquires a tag until the tag acquisition end flag is turned on. According to this exemplary embodiment, a tag is acquired from a network server until a user instructs to stop reproduction of an image.

In step S1705, the control unit 101 receives a tag transmitted from the network server through the network I/F 108.

In step S1706, the control unit 101 determines whether the received tag corresponds to the reference date and time information or not. More specifically, the control unit 101 determines whether the received tag is to be displayed or not based on the registration date and time of the received tag, reference date and time information for filtering, and date-and-time range information. Here, the reference date and time information for filtering and date-and-time range information are acquired in step S602. If the received tag is determined to be displayed, the process moves to step S1707. If the tag is determined not to be displayed, the process moves to step S1709.

In step S1707, the control unit 101 adds the tag determined to be displayed to a display tag list to update the display tag list and records it in the internal recording unit 102. In step S1708, the control unit 101 displays the tag over an image of the still image file that is being displayed on the display unit 105 based on the display tag list recorded in the internal recording unit 102.

In step S1709, the control unit 101 determines whether the stop of the tag acquisition has been instructed or not. In this case, the control unit 101 determines whether the stop of the display of the still image file has been instructed by a user through the input unit 106 or not. If the stop of display has not been instructed, the process returns to step S1704, and the process is repeated until the tag acquisition end flag is turned on. On the other hand, if the stop of display has been instructed, the process moves to S1710.

In step S1710, the control unit 101 turns on the tag acquisition end flag. Thus, the process of image display ends.

In a state that a tag is being displayed over an image, the process from step S1704 to step S1710 is repeated. Thus, when a tag is registered in the network server by another user, the tag is received in step S1705. The tag determined to be displayed in step S1706 is displayed over the image in step S1708 in a manner that it is updated automatically.

According to this exemplary embodiment, in order to display a tag over an image of an image file captured in the past, the reference date and time information to be used for tag filtering is acquired automatically from the image file. This easily allows proper filtering.

Other Exemplary Embodiments

According to the aforementioned exemplary embodiments, a tag received from a network server is filtered in the display control apparatus 100. Such filtering may be performed in the network server through transmission of a filtering setting to the network server. In this case, the display control apparatus 100 receives a tag determined as a tag to be displayed by the network server as a result of filtering using a filtering setting transmitted to the network server. In other words, all of such received tags are stored in the display list.

In addition to the aforementioned exemplary embodiments, direction information may be used to perform more proper filtering. In some cases, it may not be proper that a tag generated at a position in the just opposite direction of the position when it is captured among tags around the current position is displayed within a range of a captured and displayed image. For example, in a location where a mountain is bounded on the north and a sea is bounded on the south, when a tag user captures the mountain on the north, the generated image does not show the sea. However, tags to be generated for the location may be not only mountain-related but also sea-related. Thus, sea-related tags may be received when tag information is received without using direction information. In this case, a direction acquisition unit configured to acquire a direction such as a magnetic field sensor may further be provided in order to perform tag filtering in accordance with the direction where the image has been captured. In other words, a captured image in this case is associated with direction information. In order to reproduce an image associated with direction information, the associated direction information is referred to determine a proper tag for display in the direction described by the referred direction information among tags received from the network server. Based on the position information associated with an image that is being reproduced and position information associated with the tag, the distance between them may be acquired. The display position of the tag information may be changed in accordance with the acquired distance. For example, it may be controlled such that a tag may be displayed at a more upper part of a screen as the distance between the position where the tag has been generated and the position where the image that is being reproduced has been captured increases. This allows a user to intuitively grasp the tag-generated position.

According to the aforementioned exemplary embodiments, an update date and time is used as reference date and time information for filtering. Alternatively, a tag checking date and time may be prepared as an update date and time for filtering separately from an update date and time for an image file. For example, such a tag checking date and time may be recorded in an area, what is called "MakerNote" in a header part of an image file. When a tag is displayed with reproduction of an image, not only the update date and time of the image file but also the tag checking date and time are updated. Thus, the timing of editing an image file and the timing of checking a tag may be managed separately.

Having described various exemplary embodiments according to the present invention, the present invention is not limited to those exemplary embodiments. Changes may be made thereto without departing the scope of the present invention, and the exemplary embodiments may be combined as required.

Having described the case that a display control apparatus is applied to an image pickup apparatus according to the exemplary embodiments, the present invention is not limited to the case. The present invention is applicable to any apparatus having a display unit.

The present invention may be implemented by execution of the following process. That is, a process may be executed in which a program of implementing a function of any of the aforementioned exemplary embodiments is supplied to a display control apparatus over a network or through a recording medium, and a computer (such as the control unit 101) in the display control apparatus reads and executes the program.

According to the present invention, proper filtering may be performed more easily.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

This application claims the benefit of Japanese Patent Application No. 2013-087696, filed Apr. 18, 2013, which is hereby incorporated by reference herein in its entirety.

What is claimed is:
1. A display control apparatus comprising:
a recording unit configured to record in a recording medium an image file with which position information and date and time information are associated;
a reproducing unit configured to reproduce the image file recorded in the recording medium;
a receiving unit configured to receive tag information determined based on position information associated with the image file to be reproduced by the reproducing unit among tag information recorded in a recording medium of an external device;
a determining unit configured to determine tag information to be displayed on a playback screen of the image file based on date and time information associated with the image file to be reproduced in the received tag information; and
a display control unit configured to perform control to display the tag information determined by the determining unit on the playback screen of the image file.

2. The display control apparatus according to claim 1, wherein the tag information is displayed over a playback screen of the image file.

3. The display control apparatus according to claim 1, wherein the determining unit determines tag information to be displayed over the playback screen of the image file based on date and time information associated as a generation date and time with the image file to be reproduced.

4. The display control apparatus according to claim 3, wherein the generation date and time are recorded in a header part of the image file.

5. The display control apparatus according to claim 1, wherein the determining unit determines tag information to be displayed over the playback screen of the image file based on date and time information associated as an update date and time with the image file to be reproduced.

6. The display control apparatus according to claim 5, further comprising an updating unit configured to update an update date and time associated with the image file to be reproduced when the display control unit performs control such that the tag information is displayed over the playback screen of the image file.

7. The display control apparatus according to claim 5, wherein the update date and time are recorded in a management area of the recording medium in which the image file is recorded.

8. The display control apparatus according to claim 1, further comprising an accepting unit configured to accept an instruction according to a user operation, wherein
the determining unit determines tag information to be displayed over the playback screen of the image file based on date and time information selected in accordance with a user operation between date and time information associated as a generation date and time with the image file to be reproduced and date and time information associated as an update date and time with the image file to be reproduced.

9. The display control apparatus according to claim 1, further comprising an accepting unit configured to accept an instruction according to a user operation, wherein
the determining unit determines tag information to be displayed over the playback screen of the image file based on date and time information selected by a user operation among date and time information associated as a generation date and time with the image file to be reproduced, date and time information associated as an update date and time with the image file to be reproduced, and date and time information describing a current date and time.

10. The display control apparatus according to claim 1, wherein
the image file is further associated with direction information in addition to position information and date and time information; and
the determining unit determines tag information to be displayed over a playback screen of the image file based on date and time information and direction information associated with the image file to be reproduced in the received tag information.

11. The display control apparatus according to claim 1, wherein:
the image file is further associated with direction information in addition to position information and date and time information; and
the receiving unit receives tag information determined based on position information and direction information associated with the image file to be reproduced by the reproducing unit in tag information recorded in the recording medium in the external device.

12. The display control apparatus according to claim 1, further comprising an image capturing unit configured to capture an image of a subject and generate an image file, wherein
the recording unit records in the recording medium the image file generated by the image capturing unit in association with position information and date and time information.

13. The display control apparatus according to claim 12, further comprising:
a position acquiring unit configured to acquire current position information describing a current position of the display control apparatus; and
a date-and-time acquiring unit configured to acquire current date and time information describing a current date and time, wherein
the image capturing unit further sequentially outputs image data acquired by capturing images serially to a display unit; and
when the image capturing unit sequentially outputs the image data to the display unit, the receiving unit further receives tag information determined based on the current position information in tag information recorded in the recording medium of the external device;
the determining unit further determines tag information to be displayed over image data output to the display unit based on the current date and time information in tag information received by the receiving unit; and
the display control unit further performs control to display the tag information determined by the determining unit over image data output to the display unit.

14. The display control apparatus according to claim 1, wherein the image file is a still image file.

15. The display control apparatus according to claim 1, wherein the image file is a moving image file,
the display control apparatus further comprises a calculating unit configured to calculate date and time information by adding a reproduction time from the first frame of certain frames of the moving image file to be reproduced to date and time information associated with the moving image file; and
the determining unit determines tag information to be displayed over a playback screen of the image file based on the date and time information calculated by the calculating unit in the received tag information.

16. A display control apparatus comprising:
a recording unit configured to record in a recording medium an image file with which position information and date and time information are associated;
a reproducing unit configured to reproduce an image file recorded in the recording medium;
a transmitting unit configured to transmit position information and date and time information associated with the image file to be reproduced to an external device;
a receiving unit configured to receive tag information determined based on the position information and date and time information transmitted by the transmitting unit in tag information recorded in a recording medium in the external device; and
a display control unit configured to perform control to display the received tag information on the playback screen of the image file.

17. A display control apparatus comprising:
- a recording unit configured to record in a recording medium an image file with which position information is associated;
- a reproducing unit configured to reproduce the image file recorded in the recording medium;
- an acquiring unit configured to acquire multiple pieces of tag information determined based on position information associated with the image file to be reproduced by the reproducing unit;
- a determining unit configured to determine tag information to be displayed on a playback screen of the image file based on date and time information in the acquired multiple pieces of tag information; and
- a display control unit configured to perform control to display the tag information determined by the determining unit on the playback screen of the image file.

18. A control method for a display control apparatus, the method comprising:
- recording in a recording medium an image file with which position information and date and time information are associated;
- reproducing the image file recorded in the recording medium;
- receiving tag information determined based on position information associated with the image file to be reproduced among tag information recorded in a recording medium of an external device;
- determining tag information to be displayed over a playback screen of the image file based on date and time information associated with the image file to be reproduced in the received tag information; and
- performing control to display the tag information determined by the determining on the playback screen of the image file.

19. A computer-readable recording medium in which a program capable of causing a computer to function as the display control apparatus according to claim 17 is recorded.

* * * * *